UNITED STATES PATENT OFFICE.

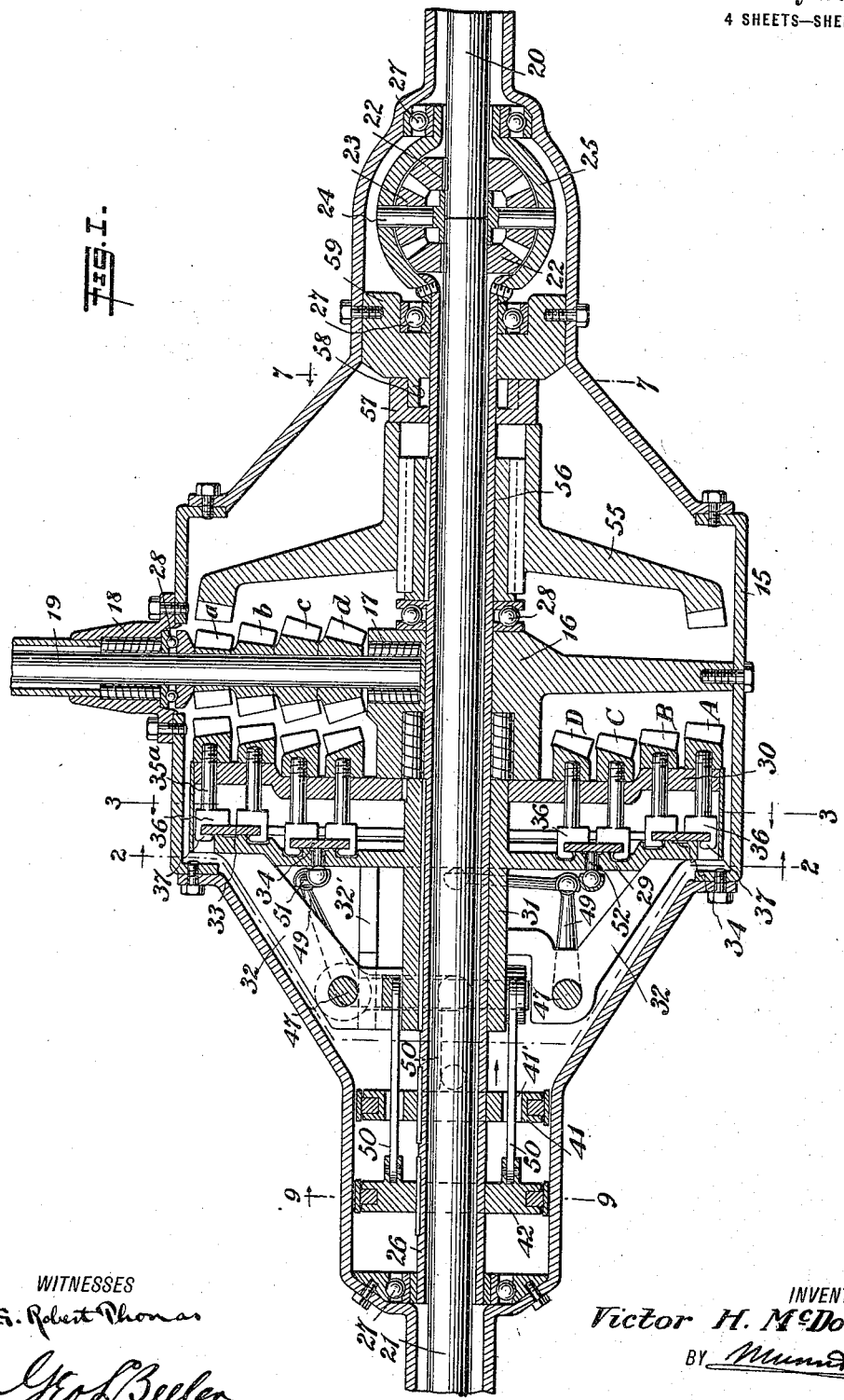
V. H. McDOUGAL.
CHANGE SPEED GEARING.
APPLICATION FILED JUNE 25, 1914.
1,147,524.
Patented July 20, 1915.
4 SHEETS—SHEET 1.
WITNESSES
G. Robert Thomas
Geo. L. Beeler
INVENTOR
Victor H. McDougal
BY
ATTORNEYS

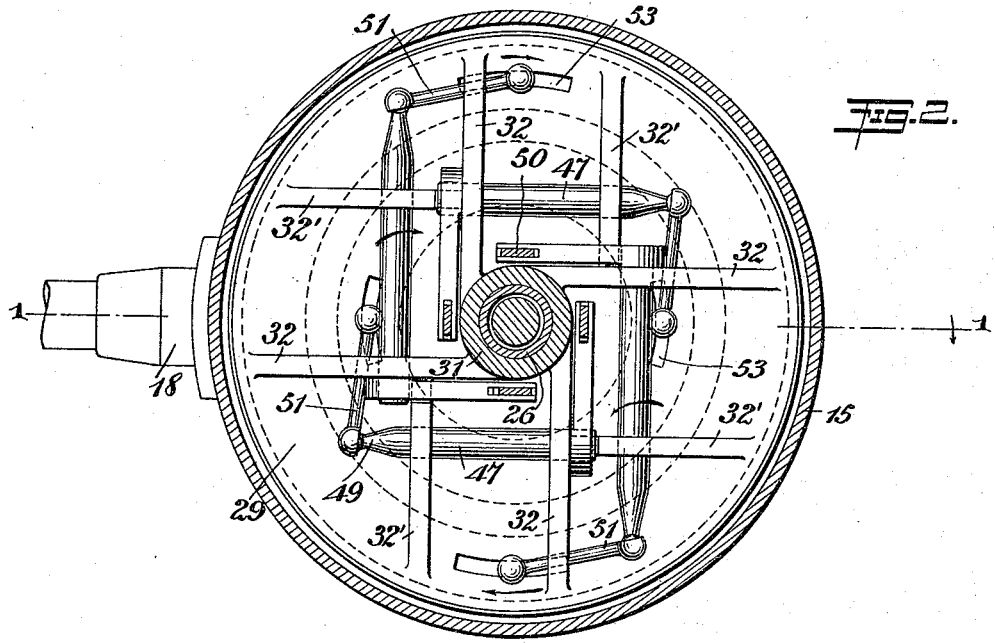
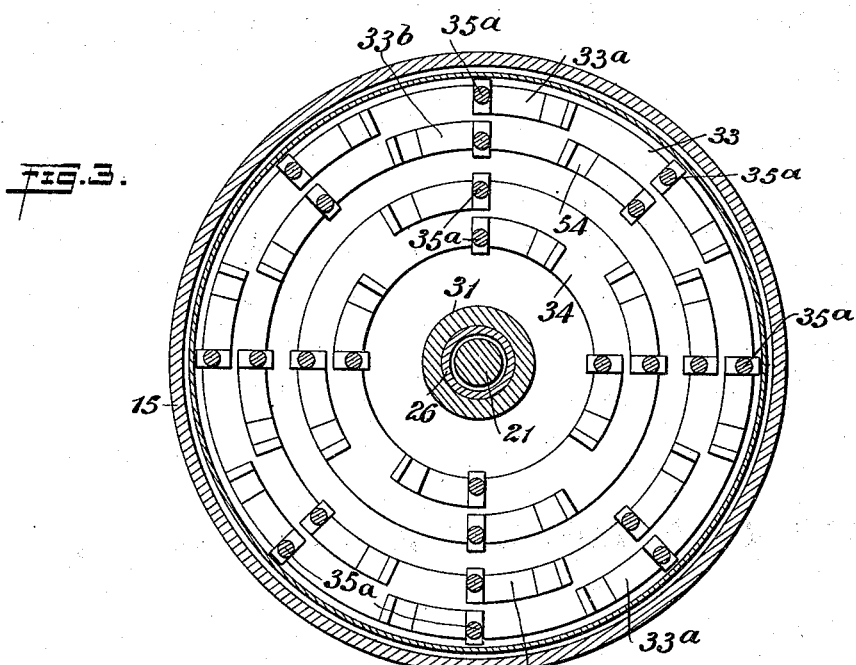

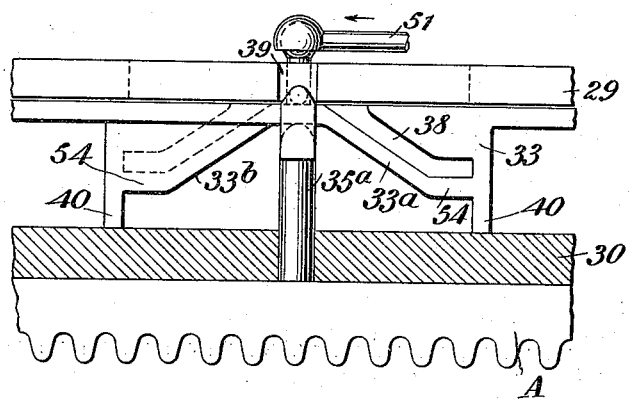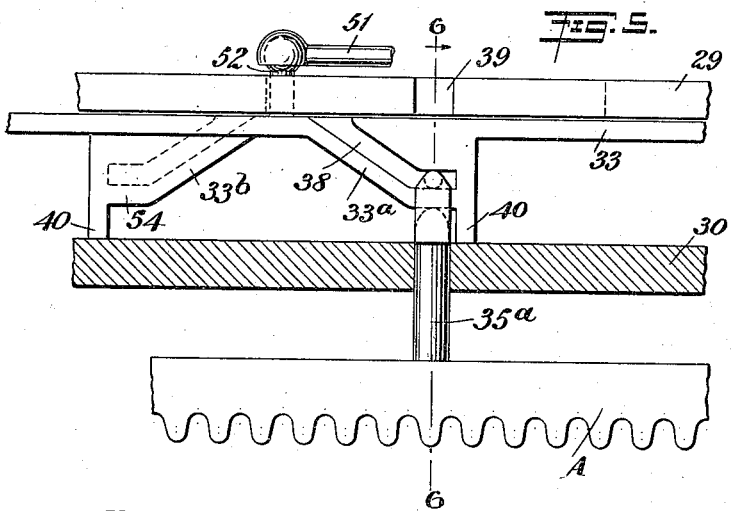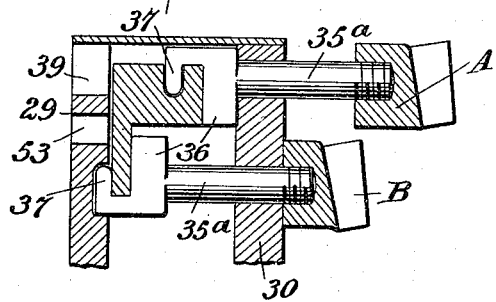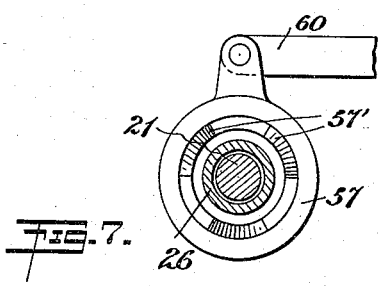

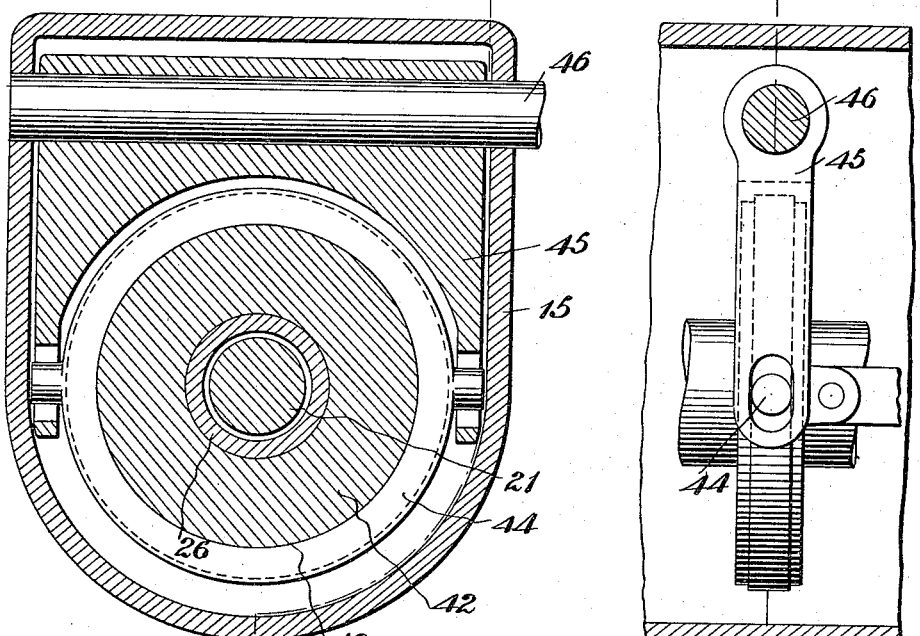

VICTOR H. McDOUGAL, OF NORTH ROBINSON, OHIO.

CHANGE-SPEED GEARING.

1,147,524.  Specification of Letters Patent.  Patented July 20, 1915.

Application filed June 25, 1914. Serial No. 847,222.

*To all whom it may concern:*

Be it known that I, VICTOR H. McDOUGAL, a citizen of the United States, and a resident of North Robinson, in the county of Crawford and State of Ohio, have invented a new and Improved Change-Speed Gearing, of which the following is a full, clear, and exact description.

This invention relates to transmission devices for traction vehicles or other machinery, and has particular reference to change speed mechanism.

Among the objects of the invention is to provide a plurality of possible speeds from a driving element having constant uniform speed and each speed being through a direct drive.

Another object of the invention is to generally improve this class of machinery with a view to making the devices more efficient and reliable in practical service.

The foregoing and other objects of the invention will hereinafter be more fully described and claimed and illustrated in the drawings forming a part of this specification in which like characters of reference indicate corresponding parts in all the views, and in which—

Figure 1 is a horizontal sectional view showing a preferred embodiment of my invention, the section being on the line 1—1 of Fig. 2; Fig. 2 is a vertical section substantially on the broken line 2—2 of Fig. 1; Fig. 3 is a similar view on the line 3—3; Fig. 4 is a detail indicating the shifting mechanism in neutral position; Fig. 5 is a similar view showing one of the gears shifted; Fig. 6 is a transverse section on the line 6—6 of Fig. 5; Fig. 7 is a transverse sectional detail on the line 7—7 of Fig. 1; Fig. 8 is a perspective detail of one of the rock shaft and crank mechanisms; Fig. 9 is a transverse section on the line 9—9 of Figs. 1 and 10; and Fig. 10 is a detail on the broken line 10—10 of Fig. 9.

The several parts of the device may be made of any suitable materials, and the relative sizes and proportions, as well as the general design of the mechanism, may be varied to a considerable extent without departing from the spirit of the invention hereinafter more fully described and claimed.

I show at 15 a fixed gear casing having substantially at its center a rigid bar 16 in which at 17 and in a bearing 18 is journaled a power shaft 19, which is presumed to be operated from any suitable prime mover or engine (not shown) and in the same direction for both the direct and reverse drives.

At 20 and 21 I show the driven axles in alinement with each other, each having secured thereto a gear 22 of a differential gear mechanism including a plurality of pinions 23 carried by spindles 24 extending into a housing 25 journaled around the axles 20 and 21 within the main casing 15 and carried by the end of a quill 26 which extends substantially throughout the length of the casing 15 and surrounding the axle 21. Any suitable bearings 27 and 28 may be provided to take up the wear between the relatively movable parts.

Secured rigidly in any suitable manner within the casing 15 to the quill 26 are substantially parallel spaced plates 29 and 30. The plate 29 is shown provided with an attachment hub 31 which extends along the quill on opposite sides of the plate, and the plate 30 is secured to one part of said hub. The two plates, therefore, always maintain precisely the same relation to each other and to the quill.

At 32 I show a series of diagonally arranged arms extending from the end of the hub 31 opposite the plate 30 tangentially outwardly from the hub and thence on an incline to the periphery of the plate 29. I also provide auxiliary arms 32′ which extend from the primary arms 32 to the plate 29, one arm 32 and an arm 32′ leading from the next adjacent arm 32 constituting a pair, and all of the arms secured to the hub 31 and to the plate constitute what I may call a "spider" for the support of certain actuating mechanism described later.

A driving shaft 19 is shown provided with a series of driving pinions *a, b, c* and *d*, all rigidly secured as by shrinkage or otherwise to the driving shaft and hence all driven simultaneously at the same angular velocity. Between the plate 30 and the pinions are a series of gear rings A, B, C and D corresponding to and adapted to mesh with said pinions respectively, but all normally disconnected therefrom. These gear rings in normal or neutral position all abut snugly against the face of the plate 30, but are adapted to be forced therefrom selectively into engagement with the respective pinions according to the speed desired.

Arranged adjacent the face of the plate 29 toward the plate 30 are actuator rings 33 and 34 adapted to be rotated to a certain extent in either direction independently of the plate 29. Each actuator ring has a series of reversely arranged cam members. These cam members are arranged in pairs and the members of each pair diverge from a common point. See Figs. 4 and 5. Extending from the actuator rings are plungers which are parallel to one another and to the axis of the quill, said plungers extending through the plate 30 and are rigidly secured to the gear rings. Noting again Figs. 4 and 5, the actuator ring 33 is provided with cam members $33^a$ and $33^b$ having reference especially to the gear rings A and B. The plungers $35^a$ are connected to the gear ring A and are actuated by the cams $33^a$. Each plunger has a head 36 which receives the direct impact of the actuator ring cam member whereby all of the plungers connected to a single gear ring are forced simultaneously and rigidly toward the axis of the driving shaft 19 and hence into mesh with the corresponding driving pinion. Each head 36, furthermore, is provided with a lip 37 which hooks or engages over into a cam groove 38 parallel to the cam surface which operates said head. The function of the lip and the coöperation therewith in the cam groove is for positively withdrawing the gear ring out of driving engagement and back to neutral position. The lips 37 in neutral position occupy places in recesses or notches 39 in the plate 29. At 40, Figs. 4 and 5, I show studs constituting rigid spacers extending from the actuator rings into engagement with the adjacent surface of the plate 30.

At 41 and 42 I show a pair of slidable disks splined to the quill 26 and hence held from rotation thereon. Each slidable disk has a peripheral groove 43 in which is mounted a non-rotary ring 44 acted upon by a shifting yoke 45 secured rigidly to a rock shaft 46 which will be understood as being connected to any suitable controlling lever (not shown).

In each pair of spider arms 32 and 32' is journaled an actuator rock shaft 47 which is adapted to rotate to a certain extent in either direction around its axis arranged transverse to the axis of the quill. Each rock shaft has two cranks 48 and 49 extending therefrom at its opposite ends and in planes perpendicular to each other. Each crank 48 is connected by a link 50 to one of the disks 41 or 42, and the other crank 49 is connected by means of a link 51 to a pin 52 extending through a slot 53 in the plate 29, said pin being rigidly secured to one of the actuator rings 33 or 34. Each disk 41 or 42 has connected to it preferably two of these links 50 on opposite sides of the quill. The links 51 likewise are arranged in pairs on opposite sides of the quill whereby each of the actuator rings is given an impulse at at least two points on opposite sides of its center when the disk 41 or 42 relating thereto is shifted longitudinally of the quill in either direction by means of the yoke mechanism. As above intimated, the disks 41 and 42 have slidable movement only with respect to the quill, and each of them is adapted to be shifted in either direction from the neutral position shown in Fig. 1. The links 50 pivoted to the disk 42 have free movement through the body of the disk 41 in the holes 41'.

The operation of the device thus far described may be briefly summarized as follows: If the disk 41 be shifted toward the right in Fig. 1, the connected parts will be moved in the directions shown by the arrows on Fig. 2, and hence the actuator ring 33 will be rotated so as to cause the plungers $35^a$ to be actuated by reason of the cams $33^a$ with the result that the gear ring A will be brought into mesh with the pinion $a$. The operating thrust upon each gear ring is sustained normally by means of a circumferential shoulder 54 at the end of each of the cam members. The return movement of the disk 41 will disengage the gear ring A and the continued movement of the disk in the return direction will cause the cams $33^b$ to project the next higher speed gear ring B into operating position. Likewise a movement of the disk 42 in either direction will actuate one or the other of the highest speed gears C or D in a manner similar to that above described. The reverse movement of the machine may be effected in any suitable manner from the power shaft, and for this purpose I provide a reverse gear 55 splined to a sleeve 56 keyed to the quill on the opposite side of the hub 16 from the plates 29 and 30, said gear 55 being adapted to mesh with the slow speed pinion $a$. The reversing gear 55 may be retained in idle position by any suitable means, and it is adapted to be projected into mesh with the pinion by means of a cam disk 57 having cam projections 57' coöperating with corresponding projections 58 on a fixed member 59. The cam disk 57 is adapted to be operated by means of a lever 60 of any suitable construction, the same being connected to the upper portion of the cam disk.

Having thus described my invention, I claim as new and desire to secure by Letters Patent:—

1. In change speed gearing, the combination of a casing, a driving shaft journaled in the casing, a series of pinions rigidly secured to the driving shaft, a driven shaft journaled in the casing at right angles to the driving shaft, a spider fixed to the driven shaft, a series of concentric gear rings surrounding the driven shaft and adapted to be engaged selectively with the respective pinions, actuator rings carried by the spider and normally rotatable therewith, plungers extending between the actuator rings and the gear rings, and a plurality of rock shafts and cranks adapted to rotate the actuator rings to a certain extent in either direction independently of the rotation of the spider whereby certain of the plungers will cause the engagement of one of the gear rings with its driving pinion.

2. In change speed gearing, the combination of a driving shaft, a series of pinions fixed thereon, a driven shaft, a series of gear rings surrounding the driven shaft and adapted to mesh with the respective pinions, a plate parallel to the gear rings and having a hub fixed to the driven shaft, an actuator ring associated with said plate and adapted to rotate to a limited degree in either direction independently of the rotation of the plate, said actuator ring having a plurality of series of cam members, a series of plungers secured to each gear ring and adapted to be actuated by one of the series of cam members to cause said gear ring to be moved into engagement with its driving pinion, a plurality of rock shafts journaled on axes parallel to the driving shaft to rotate the actuator ring, and connections between the rock shafts and the actuator ring whereby the aforesaid rotation thereof is effected.

3. In change speed gearing, the combination of a driving shaft, a plurality of driving pinions secured thereto, a driven shaft arranged at right angles to the driving shaft, a plurality of gear rings surrounding the driven shaft and adapted to mesh selectively with the driving pinions, a pair of plates secured to the driven shaft parallel to the gear rings, an actuator ring associated with one of said plates and having cam members formed thereon in oppositely arranged pairs, plungers coöperating with the respective gear rings through the other of said plates, certain of said plungers being acted upon by one set of cams and the others by the other cams, and means to rotate the actuator ring independently of the rotation of the driven shaft in either direction to cause one or the other of said gear rings to be brought into mesh with its driving pinion.

4. In change speed gearing, the combination of a driving shaft, a plurality of driving pinions secured thereto, a driven shaft, a plurality of gear rings surrounding the driven shaft and adapted to mesh selectively with the driving pinions, a plate secured rigidly to the driven shaft in a plane perpendicular thereto, an actuator ring associated with the plate and having cam members formed thereon in oppositely arranged pairs on the side thereof adjacent the gear rings, plungers coöperating with the respective pairs of cam members, means to rotate the actuator ring in either direction from the normal position independently of the rotation of the plate and driven member to cause certain of the plungers to be actuated in lines parallel to the driven shaft to cause one or the other of said gear rings to be operated, said cam members terminating in circular shoulders to make the driving connection of the gears effective, and means coöperating with said plungers to support the same and cause all of the plungers and gear rings to rotate simultaneously with the driven shaft.

5. In transmission mechanism, the combination of a driving shaft, a plurality of driving pinions secured thereto, a driven shaft, a plurality of gear rings surrounding the driven shaft opposite the respective pinions, a plate secured to the driven shaft in a plane perpendicular thereto, an actuator ring associated with said plate, plungers coöperating with said actuator ring and secured rigidly to said gear rings, and a plurality of rock shafts journaled on axes parallel to said plate and having crank and link connections with said actuator ring, substantially as and for the purposes set forth.

In testimony whereof I have signed my name to this specification in the presence of two subscribing witnesses.

VICTOR H. McDOUGAL.

Witnesses:
HARRESON G. SMITH,
J. KNELL.

Copies of this patent may be obtained for five cents each, by addressing the "Commissioner of Patents, Washington, D. C."